United States Patent
Ho et al.

[11] Patent Number: 5,943,621
[45] Date of Patent: Aug. 24, 1999

[54] METHOD AND APPARATUS FOR TRACKING MOBILE STATIONS IN A WIRELESS COMMUNICATIONS SYSTEM

[75] Inventors: Joseph Ho, Dallas; Jim Xu, Plano, both of Tex.

[73] Assignee: Northern Telecom Limited, Montreal, Canada

[21] Appl. No.: 08/923,927

[22] Filed: Jul. 24, 1997

[51] Int. Cl.[6] .................................................. H04B 1/00
[52] U.S. Cl. .......................................... 455/456; 455/440
[58] Field of Search .................................... 455/440, 456; 340/992, 988, 995; 701/201, 210; 235/384; 705/417; 342/457

[56] References Cited

U.S. PATENT DOCUMENTS

| | | | |
|---|---|---|---|
| 5,390,234 | 2/1995 | Bar-Noy et al. | 379/59 |
| 5,408,683 | 4/1995 | Ablay et al. | 455/33.1 |
| 5,629,975 | 5/1997 | Tiedemann, Jr. et al. | 379/60 |

OTHER PUBLICATIONS

Akyildiz and Ho, "Movement–Based Location Update and Selective Paging for PCS Networks", vol. IV, No. 4, Aug. 4, 1996, pp. 629–638.

Akyildiz and Ho, "Dynamic Mobile User Location Update for Wireless PCS Newtorks", ACM–Batzer Wireless Networks Journal, vol. 1, No. 2, Jul. 1995, pp. 187–196.

Ho and Akylidiz, "Mobile User Location Update and Paging Under Delay Constraints", ACM–Baltzer Wireless Networks Journal, vol. 1, No. 4, Dec. 1995, pp. 413–425.

*Primary Examiner*—Reinhard J. Eisenzopf
*Assistant Examiner*—Makoto Aoki
*Attorney, Agent, or Firm*—John D. Crane; Daniel E. Venglarik; Andrew J. Dillon

[57] ABSTRACT

A method and apparatus in a communications system for tracking mobile stations. The length and identify of the path of the mobile station is tracked at the mobile station. The path is monitored for a presence of a loop. In response in identifying the presence of a loop, the loop is removed from the path, wherein the length of the path is reduced. Additionally, the length of the path is compared to a threshold and a location update is performed in response to the length of the path being greater than the threshold. The threshold may also be updated at a MSC and then sent to the mobile station.

33 Claims, 8 Drawing Sheets

|   | A | B | C | D |
|---|---|---|---|---|
| A | 0 | 0 | 2 | 3 |
| B | 1 | 0 | 1 | 2 |
| C | 2 | 1 | 0 | 1 |
| D | 3 | 2 | 1 | 0 |

METHOD AND APPARATUS FOR TRACKING MOBILE STATIONS IN A WIRELESS COMMUNICATIONS SYSTEM

BACKGROUND OF THE INVENTION

1. Technical Field

The present invention relates generally to an improved communications system and in particular to a method and apparatus for tracking mobile stations within a wireless communications system.

2. Description of the Related Art

Many of the present digital telecommunications networks of the world are based on time-division multiple access (TDMA) and use transmission and switching products like digital switches and pulse coded modulation (PCM) transmission at E1 or T1 rates. TDMA users share the radio spectrum in the time domain. An individual user is allocated a time slot and, during this time slot, the user accesses the whole frequency band allocated to the system (wideband TDMA) or only a part of the band (narrow band TDMA). In TDMA, transmission takes place in bursts from a mobile station to a base station in an uplink path with only one user transmitting to the base station at any given time. In the downlink path from the base station to the mobile station, the base station usually transmits continuously with the mobile station listening only during the assigned time slot. TDMA channel multiplexes the bits from a number of users. This type of system requires transmission at a higher bit rate over a radio frequency channel.

Another technology that is becoming more widely used is code-division multiple access (CDMA) or spread spectrum. Spread spectrum techniques spread the bandwidth of the transmitting signal over a spectrum or band of frequency much larger than the minimal bandwidth required to transmit the signal. CDMA has an ability to lock out conflicting signals, which may allow it to share a system with other radio signals without interference.

Wireless technology is an important component of the global information infrastructure. To exploit the full potential of this technology, regulators and administrators of all countries are re-evaluating their spectrum allocation policy. A large segment of the spectrum around two GHz bandwidths has already been released for the use of wireless networks. More spectrum is being allocated by the International Telecommunications Union (ITU) and countries like the United States of America and Canada around the 7–10 GHz range to use wireless technology for broadband wireless applications. Wireless networks are being built all over the world to handle a large volume of traffic and mobility.

With respect to tracking and locating mobile stations within wireless communications systems, the current systems employ a location area based paging and location update scheme. FIG. 1 illustrates one scheme used in current wireless communications systems. In FIG. 1, mobile station 100 reports its location to the network whenever it enters a new registration area, also called a "location area". Seven location areas, identified as LA1 through LA7, are illustrated in FIG. 1 with each location area having seven cells. Mobile station 100 travels a path represented by dotted line 102, beginning at location area LA3, continuing to location area LA6, into location area LA4, and traveling back to location area LA6. Then mobile station 100 travels through location area LA7, returning to location area LA4, traveling through location area LA5, and mobile station 100 stopping in location area LA4.

When an incoming call arrives for mobile station 100, all cells in the residing location area LA4 page to determine the residing cell of mobile station 100. Using this method, the location areas are fixed. They cannot be adjusted from time to time based on the mobility and calling patterns of each mobile station. Furthermore, changing the location areas in the current system requires modifications to the system configuration. Different mobile stations cannot be assigned different sets of location areas even though the mobility and calling patterns vary widely among mobile stations.

Other schemes used to track and locate mobile stations include per-user based location management schemes such as time-based, distance-based and movement-based location update schemes. Under the time-based scheme, a mobile station reports its location to the network when a specified time period has elapsed after its last location update. This scheme allows the dynamic selection of the location update time interval on a per-user basis. However, a user may be located at or close to the last updated cell location when the time-out occurs. This results in unnecessary location updates. Besides, this scheme does not allow the system to determine a specific area where the mobile station can be found.

In the dynamic time-based location update scheme, the location update time interval is determined based on the probability distribution of the call arrival time. This scheme does not require any information on the mobility pattern of the subscriber. It has been demonstrated that the performance of this scheme is close to that of a distance-based scheme. However, the paging delay for this scheme is not confined and is proportional to the distance travelled by the subscriber since the last location update. This scheme may not be appropriate for systems with strict connection setup delay requirements.

Under the distance-based scheme, a mobile station reports its location to the network when it determines its distance from its last update cell location exceeds a threshold value. This method performs well since location reporting is necessary only when the mobile station is far away from its last updated location. Implementation of this scheme is complicated as it is difficult for the mobile station to determine its distance from its last updated cell location.

Under the movement-based scheme, a mobile station reports its location to the network after it has detected a specified number of cell boundary crossings. This method is simple to implement as a mobile station only has to keep a movement counter and reports its location to the network when the counter exceeds a threshold value. This method, however, does not perform as well as the distance based scheme as the mobile station may be close to or at the last updated location even though it has performed a specified number of cell boundary crossings.

The above three schemes allow dynamic adjustments on a per user basis. However, not much has been reported on how to implement these schemes under the current cellular network infrastructure. All of the above schemes require some knowledge of the mobility and calling characteristic of the mobile stations, but it is unclear how these parameters can be obtained. Therefore, it would be desirable to have an improved method and apparatus for dynamically tracking mobile stations in a wireless communications system.

SUMMARY OF THE INVENTION

The present invention provides a method and apparatus in a communications system for tracking mobile stations. The length and identity of the path of the mobile station is tracked. The path is monitored for a presence of a loop. In response to identifying the presence of a loop, the loop is removed from the path, wherein the length of the path is reduced. Additionally, the length of the loop-removed path is compared to a threshold and a location update is performed in response to the length of the loop-removed path being equal to or greater than the threshold. The threshold is also updated at a mobile switching center and sent to the mobile station.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
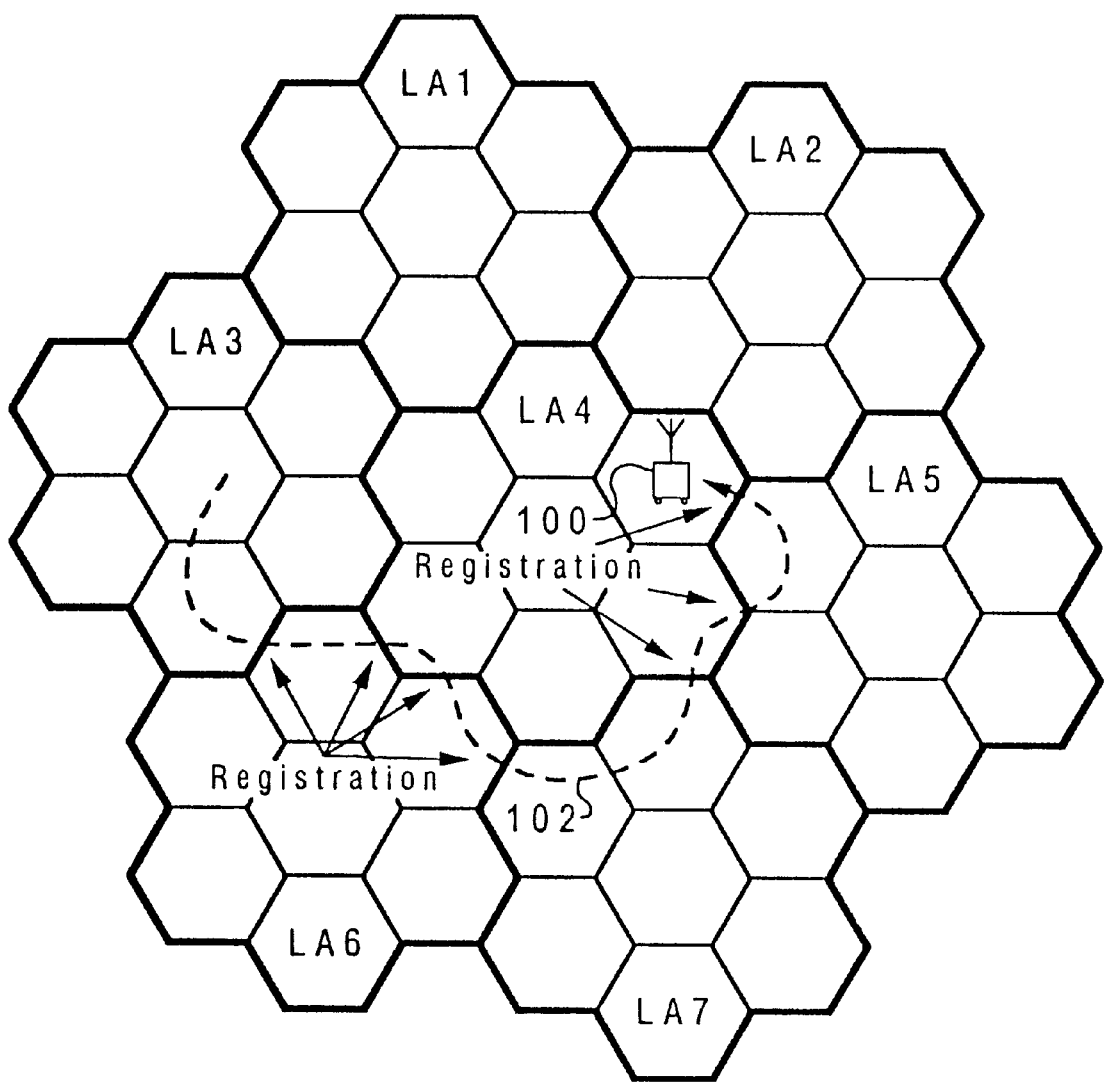
FIG. 1 illustrates one scheme used in current wireless communications systems.
Figure 2:
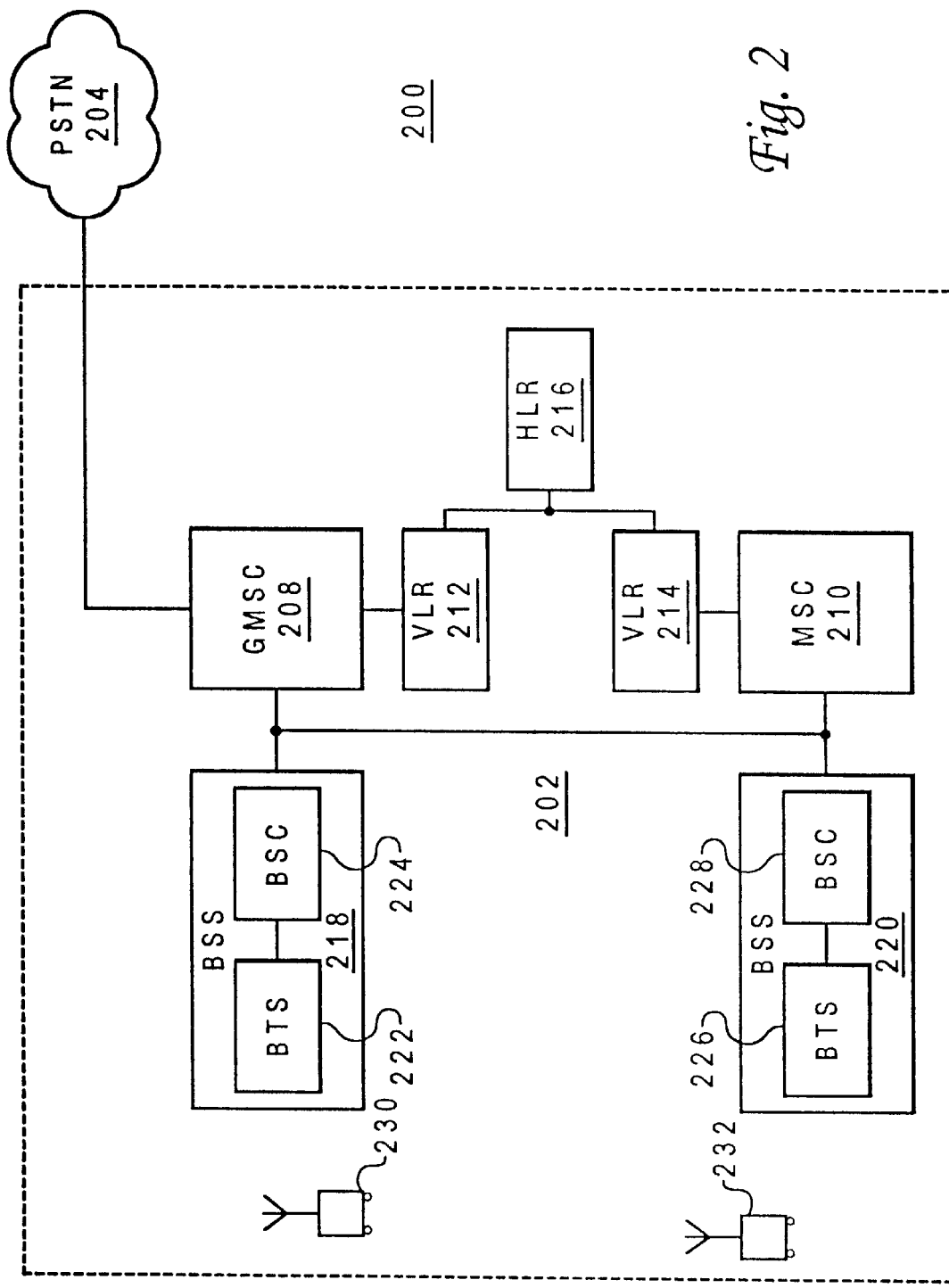
FIG. 2 is a block diagram of a communications system in which the present invention may be implemented.

With reference now to the figures and in particular with reference to FIG. 2, a block diagram of a communications system 200 is illustrated in which the present invention may be implemented. Communications system 200 includes a wireless communications system in the form of cellular system 202. In addition, also depicted in communications system 200 is a public switched telephone network (PSTN) 204. Cellular system 202 is a TDMA wireless communications system in the depicted example. More specifically, cellular system 202 is a GSM system, such as a PCS 1900 system in the United States. Although the depicted example is a GSM system, the present invention may be implemented in other types of wireless communications system, such as, for example, a wireless system under IS-95 (CDMA) or Japanese Digital Cellular Standards.

Cellular system 202 includes mobile switching centers (MSCs) 208 and 210, which have connections to visitor location registers (VLRs) 212 and 214 and a home location register (HLR) 216. MSC 208 may function as a gateway mobile switching center (GMSC), and is coupled to PSTN 204. Additionally, communications system 202 also includes base station systems (BSS)s 218 and 220. BSS 218 includes a base transceiver station (BTS) 222 and a base station controller (BSC) 224. Similarly, BSS 220 includes a BTS 226 and a BSC 228. Also illustrated in FIG. 2 are communications units in the form of mobile stations 230 and 232. Mobile stations 230 and 232 may be, for example, a handheld cellular phone, but can comprise of other mobile communication devices.

GMSC 208 performs switching of a call to/from PSTN 204 and mobile communications units 230 and 232 within wireless communications system 202. MSC 208 and 210 also validate subscriber mobile stations to determine if the subscriber is a resident of the system or a roamer by using visitor location register 212, VLR 214, and home location register 216. VLR 212 and VLR 214 are functional units that dynamically store subscriber information, such as location area, when the subscriber is located in the area covered by a particular VLR. When a roaming mobile station enters an area controlled by an MSC, the MSC informs the associated VLR about the mobile station and initiates a registration procedure for the mobile station. HLR 216 is a functional unit used for management of mobile subscribers. Subscriber information and the part of the mobile information to allow incoming calls to be routed to the MSC for a particular mobile station are stored within HLR 216. For example, VLR address, mobile station, ISDN number, and subscriber data are information stored within HLR 216. MSCs 208 and 210 perform the necessary switching functions from mobile stations located within a geographic area associated with a particular MSC, called an MSC area. The MSCs monitor the mobility of its subscribers and manages necessary resources needed to handle and update location registration procedures and carry out handoff functions. Although, in the depicted example, only two MSCs are illustrated in cellular system 202, other numbers of MSCs may be employed depending on the communications system.

BSSs 218 and 220 are the physical equipment providing radio coverage to defined geographical areas called cells. BSSs 218 and 220 contain the hardware necessary to communicate with mobile stations 230 and 232. BSC 224 and BSC 228 and BSSs 218 and 220, respectively perform a control function while BTS 222 and BTS 226 perform the transmitting/receiving function. The BTSs are the radio transmission/receiving equipment and are employed to cover each cell. A BSS can cover several cells using multiple BTSs. BTS 222 and BTS 226 each contain a transcoder rate adopter unit (TRAU) (not shown), which provides GSM's specific speech and coding and decoding processes as well as rate adaptation functions for data.

Figure 3:
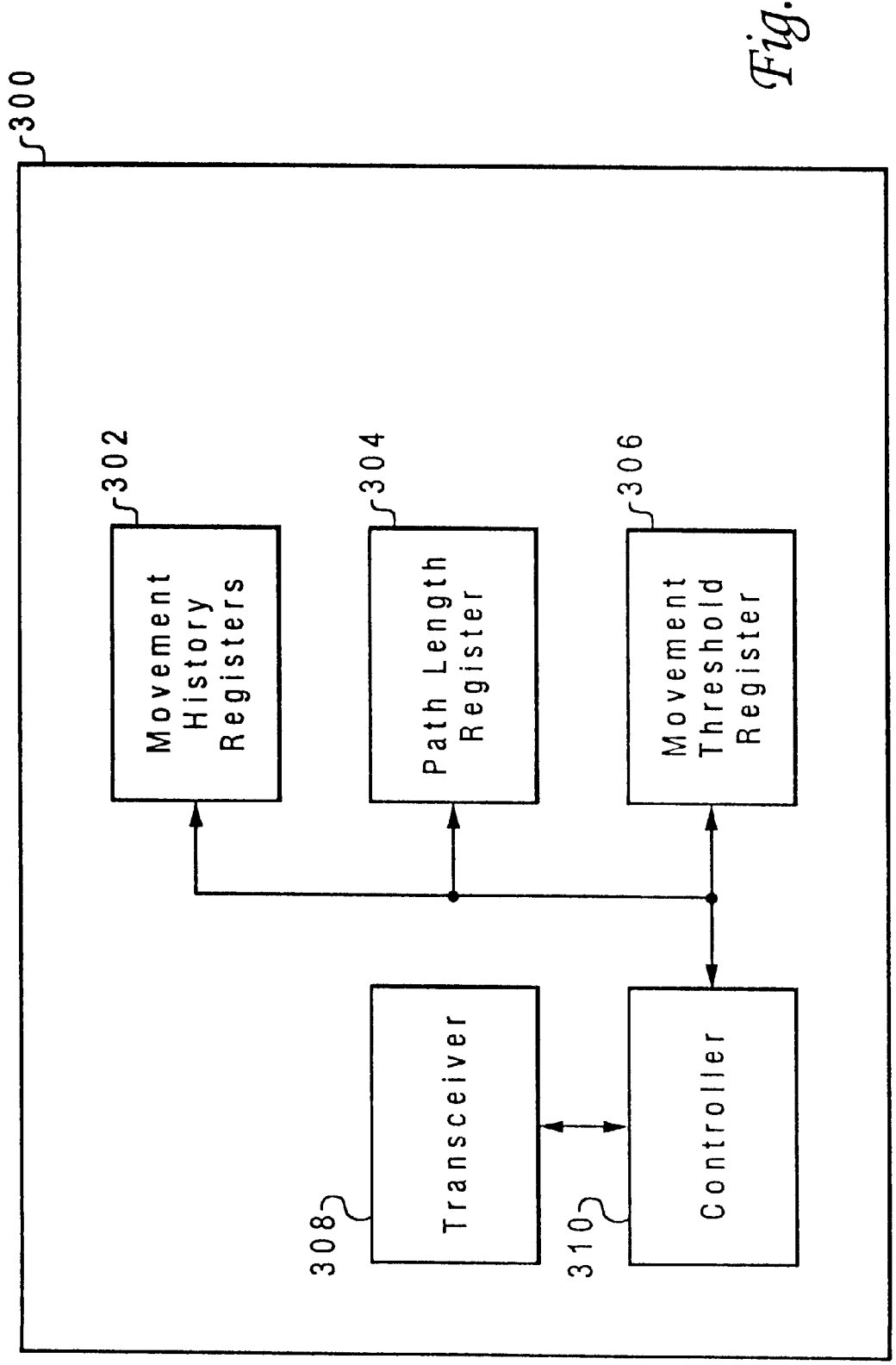
FIG. 3 is a diagram of a mobile station having a movement-based location reporting system with loop removal in accordance with a preferred embodiment of the present invention.

Mobile station 300 in FIG. 3 is suited for use in communications system 202 and is equipped with N mobility history registers 302, a path length register 304, and a movement threshold register 306. The mobility history registers 302 are organized as a stack which stores the IDs of up to N last visited cells in the loop-removed movement path of the mobile station 300. Path length register 304 records the number of movements (cell boundary crossings) in the loop-removed path of mobile station 300 since the last location update. Mobile station 300 reports it location to the associated MSC using transceiver 308 when the value of path length register 304 equals to the value stored in movement threshold register 306. The various functions of mobile station 300 are controlled by controller 310. A method for determining the value of the movement threshold is described later in this section.

In general, after mobile station 300 detects a cell boundary crossing, the ID of the new cell is added to the top of movement history registers 302, and the path length counter in path length register 304 is increased by one. After a location update, all cell IDs in the stack in movement history registers 302 are removed except the ID of the current cell, and path length register 304 is reset to 0. To ensure that movement history registers 302 and path length register 304 reflect the loop-removed movement path of mobile station 300 rather than the actual movement path, a loop removal procedure is adopted according to the present invention. Those of ordinary skill in the art will realize that although not shown in this figure, mobile station 300 contains other components used to provide a communications link between mobile station 300 and a wireless communications system 202.

Figure 4:
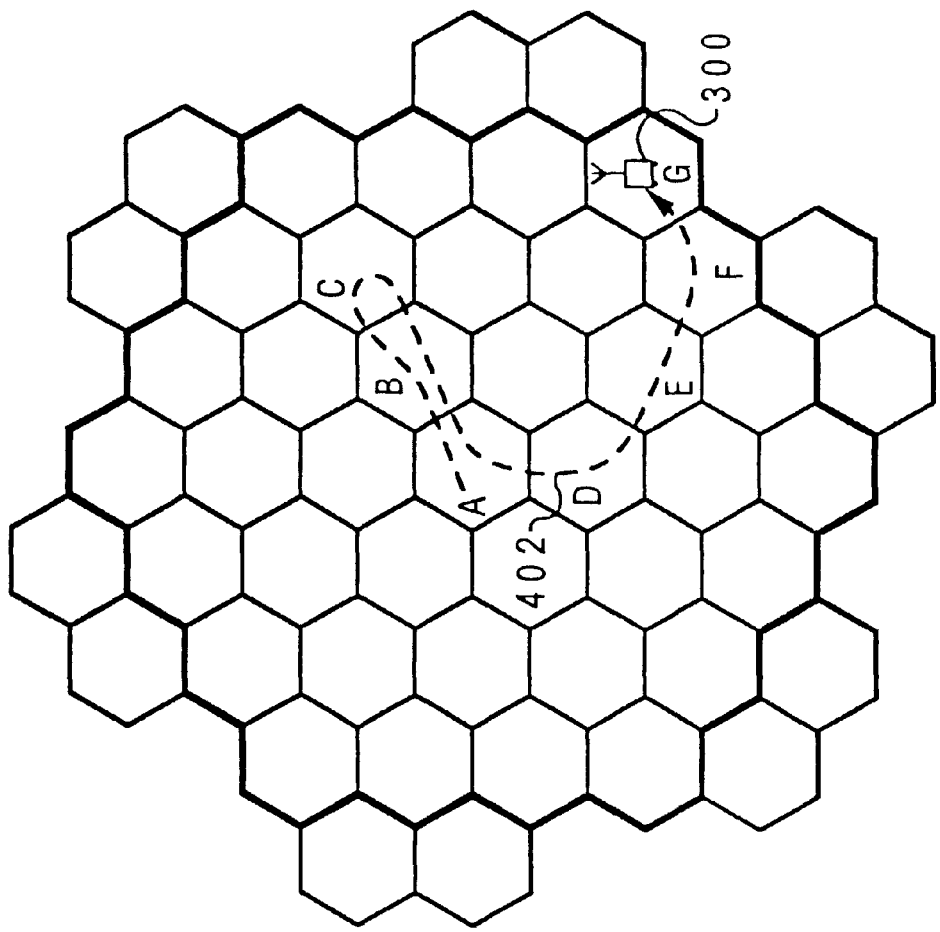
FIG. 4 is a diagram illustrating an adaptive movement threshold determination method in accordance with a preferred embodiment of the present invention.
Figure 4:
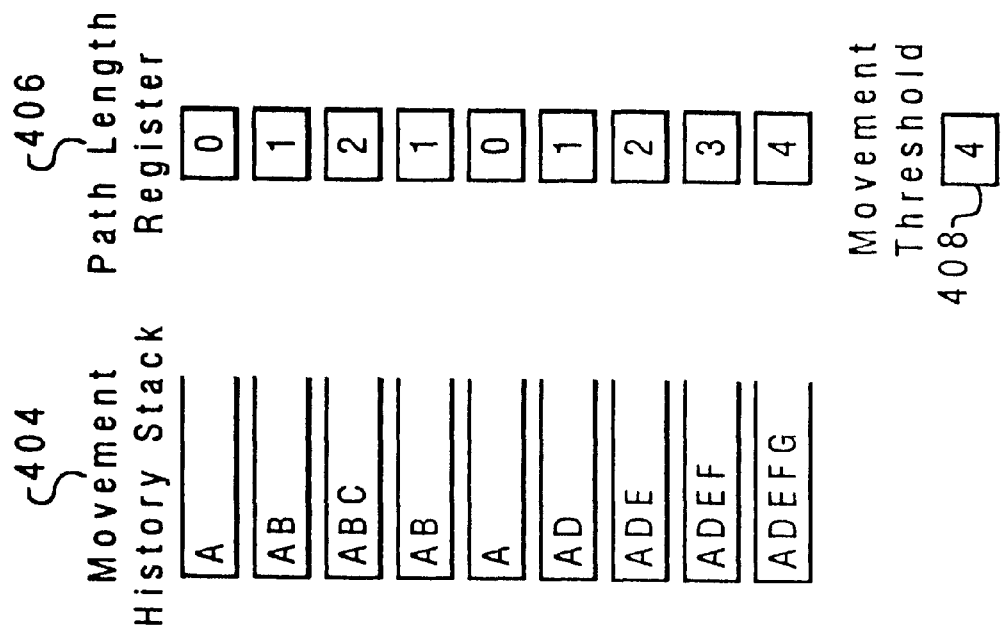

In FIG. 4, a diagram illustrating an adaptive movement-based location reporting method with loop removal is depicted in accordance with a preferred embodiment of the present invention. The example of the loop-removal procedure illustrates mobile station 300 traveling along a path depicted as dotted line 402 beginning at location A when it is initially turned on. Dotted line 402 in FIG. 4 represents the movement path of mobile station 300 after eight cell boundary crossings. Initially, movement history registers 404 contain the ID of cell A and path length register 406 is set to 0. When mobile station 300 moves from cell A to cell B, the ID of cell B is added to the top of the movement history register 404 and path length register 406 is increased by 1. A similar thing happens when mobile station 300 moves to cell C.

However, when mobile station 300 moves from cell C back to cell B, a loop is formed. Instead of adding the ID of cell B to movement history stack 404, cell IDs are removed from the top of the movement history registers 404 until the ID of cell B is at the top of the stack in movement history registers 404, and thus the loop is removed. The path length in register 406 is correspondly reduced by 1 after the removal of each cell ID from register 404. The same procedure is performed when mobile station 300 moves from cell B to cell A. Movement history register 404 and the path length counter stored in path length register 406 return to the original state as if no movement has occurred since initialization. After an additional 4 cell boundary crossings when the mobile station reaches cell G, the value of the path length counter reaches 4, which in the present example is equal to the value programmed into movement threshold register 408, and a location update is initiated.

Figure 5:
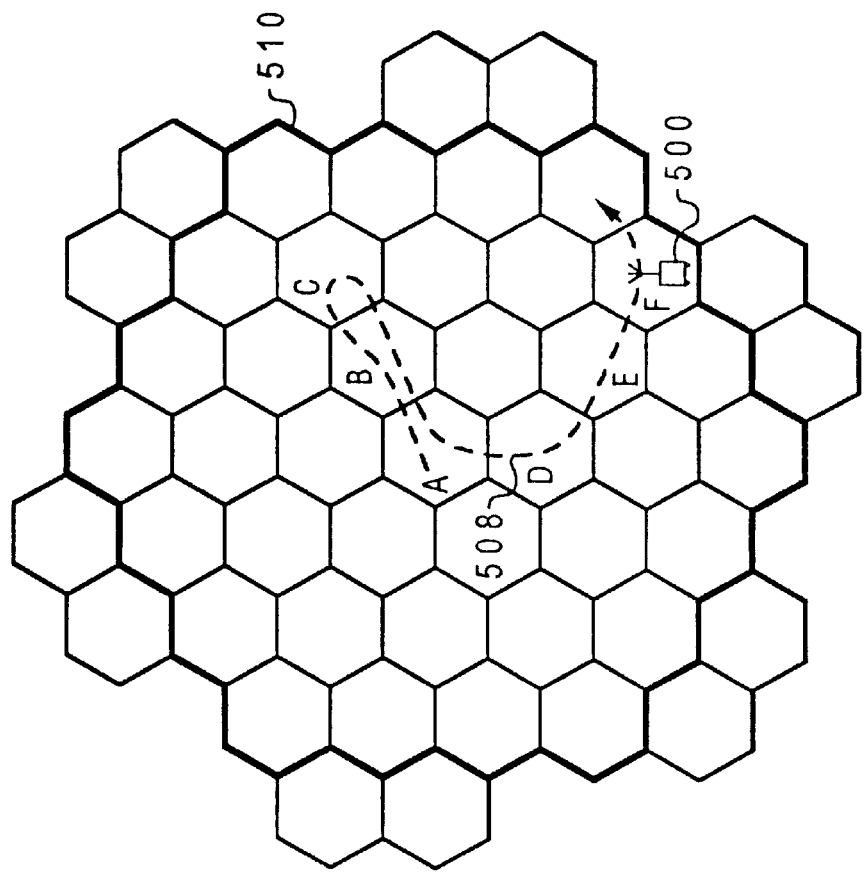
FIG. 5 is a diagram illustrating a mobile station having a movement threshold determination circuitry in accordance with a preferred embodiment of the present invention.
Figure 5:
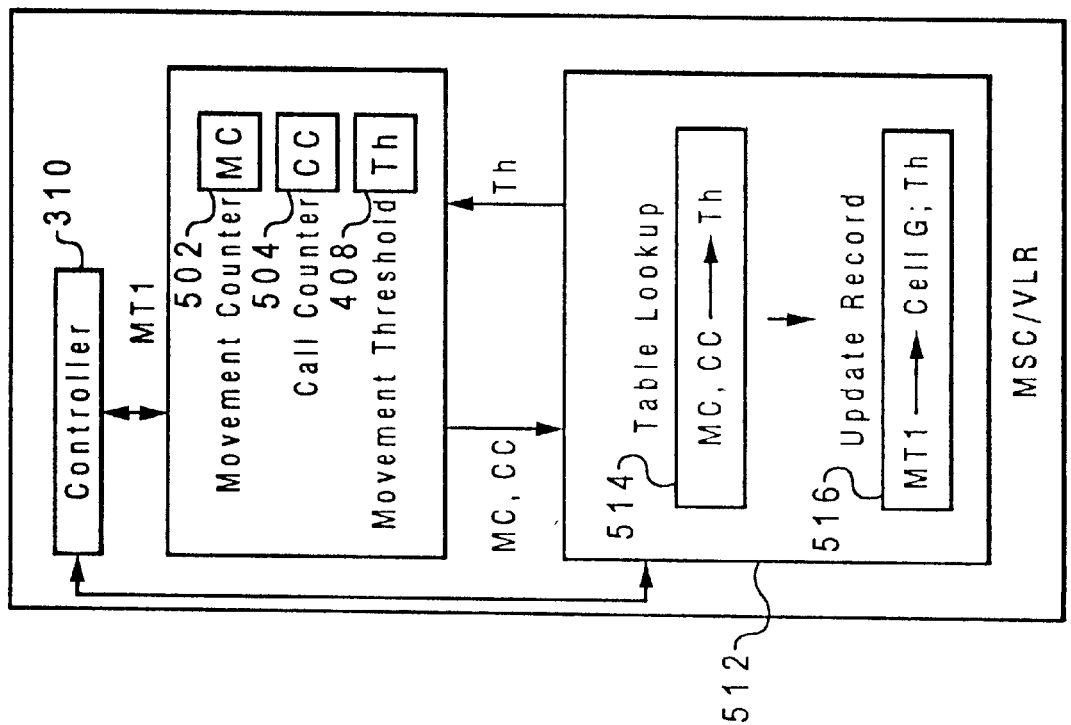

Turning next to FIG. 5, there is depicted in accordance with a preferred embodiment of the present invention the mobile station 300 including a movement counter value MC stored in register 502, a call counter value CC stored in register 504, and movement threshold Th stored in register 408. In this example, when a call for mobile station 300 arrives at a MSC, the area to be paged includes all the cells that can be reached from the last reported cell after Th cell boundary crossings by mobile station 300. Given that mobile station 300 last reported its location to the MSC at cell A and movement threshold Th is equal to 4, paging area 510 which is served by the MSC is established for mobile station 300. In the depicted example, where mobile station 300 has moved from cell A to cell F along path 508, no location update has occurred since initialization because movement counter MC does not yet equal movement threshold Th. Movement counter MC will equal movement threshold Th when mobile station 300 performs an additional movement into a new cell.

Movement threshold Th is adaptively determined based on movement counter MC and the call counter CC. Movement counter value MC is increased by 1 after each cell boundary crossing, while call counter value CC is increased by 1 whenever a mobile terminating call is received by mobile station 300. The values of movement counter MC and call counter CC are transmitted to MSC 512 whenever a location update is performed. In response to receiving these values, MSC 512 may return a new movement threshold Th for storage in threshold register 408.

MSC 512 adds the received movement and call counter values to mobile station 300's cumulative movement counter MC' and cumulative call counter CC', respectively, whenever a location update is performed. The elapsed time since movement threshold value Th for mobile station 300 is calculated by MSC 512. If this time exceeds a predefined movement threshold update interval, MSC 512 will generate a new movement threshold value for mobile station 300. This new movement threshold value Th is determined by using a look-up table 514 based on the cumulative movement counter MC' and cumulative call counter CC', and the time since movement threshold Th was last changed. MSC 512 sends this new movement threshold Th to mobile station 300, and controller 310 will then update register 408 with the new movement threshold Th and reset both the movement counter MC in register 502 and call counter CC in register 504 to 0. The values of movement counter MC and call counter CC at mobile station 300 are reset every time a location update is performed regardless of whether a new movement threshold Th is received from MSC 512. After each location update, MSC 512 records the new cell location and movement threshold Th (if it has changed) for mobile station 300 in record 516.

Movement threshold Th is determined using a number of factors, such as the topology of the wireless communications system, the cost for location update, and the cost for paging. These factors are implemented within look-up table 514 in the depicted example. This look-up table may be updated from time to time to reflect the current status of the network. Different look-up tables can be used at different times of the day and different days of the week. In addition, movement threshold Th may be updated less frequently. The detailed process for location update, paging and movement threshold Th update is described in FIG. 6 below.

Figure 6:
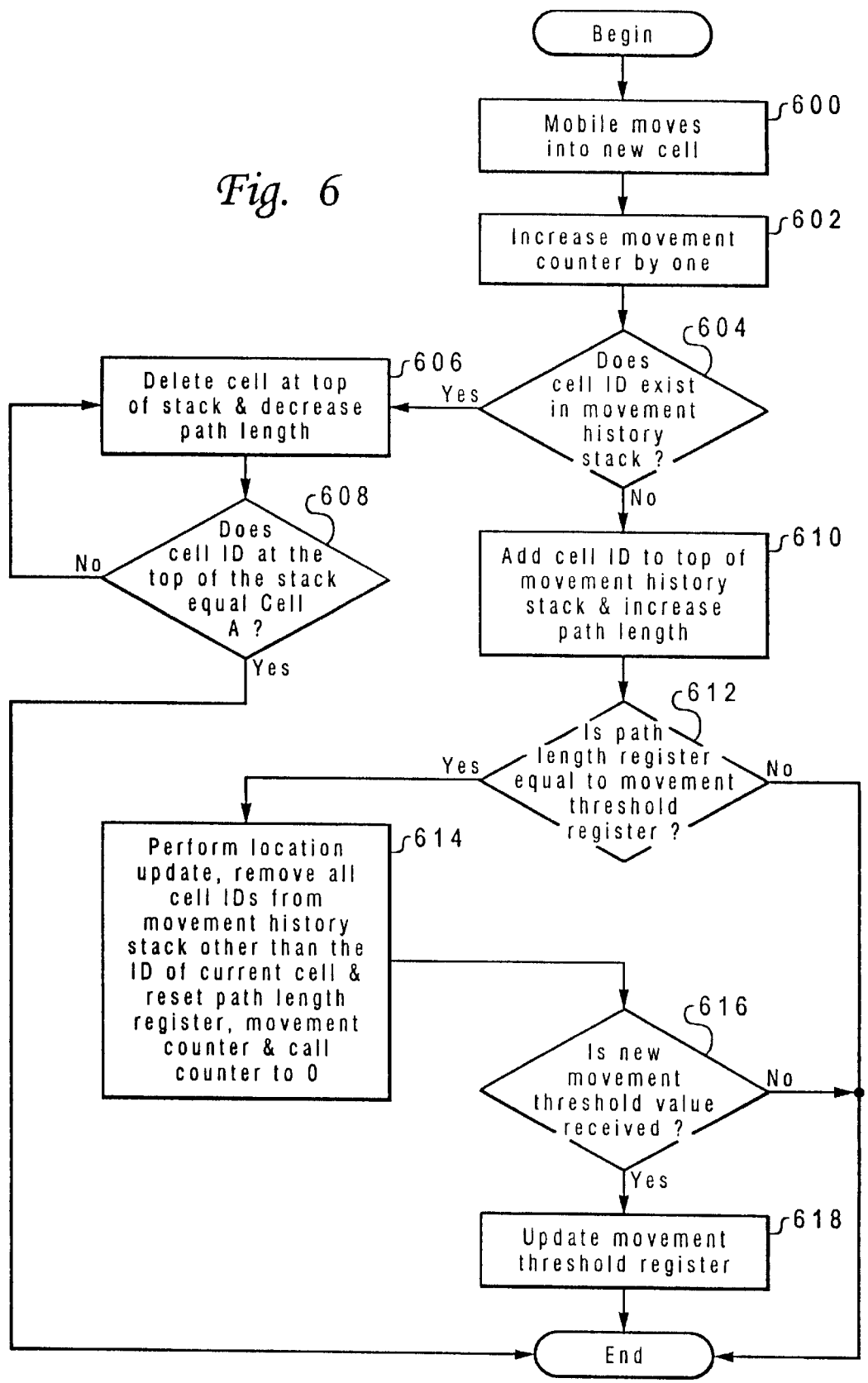
FIG. 6 is a flowchart of a location update process performed by a mobile station in accordance with a preferred embodiment of the present invention.

Next, in FIG. 6 with reference to FIG. 4 and FIG. 5, a flowchart of a location update process followed by mobile station 300 is depicted in accordance with a preferred embodiment of the present invention. The process begins whenever mobile station 300 moves into a new cell with cell ID Cell_A (step 600). Controller 310 increases the value MC in the movement counter 502 by 1 (step 602). The controller 310 then determines whether cell ID Cell_A exists in the movement history registers 404 (step 604). If cell ID Cell_A is determined to exist within the movement history registers, then controller 310 deletes the cell ID at the top of the stack in the movement history registers 404 and the path length register 406 is decreased by 1 (step 606). Next, a determination is made by controller 310 as to whether the Cell ID at the top of the stack in the movement history registers is equal to Cell_A (step 608). If this determination is yes, then the process terminates. If cell ID at the top of the stack does not equal to Cell_A, the process returns to step 604. Step 606 and step 608 are repeated until a yes is determined to remove a loop as discussed earlier in regards to FIG. 4.

With reference again to step 604, if the cell ID Cell_A is not determined to be present within the movement history registers 404, the controller 310 adds the cell ID Cell_A to the top of the stack in the movement history registers 404 and increases the value of path length register 406 by 1 (step 610). If the stack is full, the cell ID at the bottom of the stack is deleted to make room for the new cell ID.

Next, controller 310 determines whether the value of the path length register 406 equals to the movement threshold Th in register 408 (step 612). If the value of the path length register 406 equals the movement threshold register Th in register 408, a location update is performed by mobile station 300, and all cell IDs are removed from the movement history register 404 except for the cell ID of the current cell, and the value of the path length register 406, the movement counter 502, and the call counter 504 are set equal to 0 (step 614). The controller 310 then determines whether a new movement threshold value Th has been received from the MSC (step 616). If a new movement threshold value Th has been received, the controller 310 process updates the movement threshold register 408 in the mobile station 300 with the new value (step 618). After updating the movement threshold register 408 with a new value, the process then terminates.

With reference again to step 616, if a new movement threshold value is not received from the MSC, the process terminates. The process also terminates from step 612 if the value of the path length register 406 is not equal to the value of movement threshold register 408.

The process followed by the mobile station 300 in FIG. 6 allows for distributed data collection in which the mobile station continuously and efficiently collects mobility and call arrival data. This information is forwarded to the MSC during location updates. In this manner, the present invention also addresses the problem of how information of each mobile station can be collected. In fact, when the mobile terminal is idle, the MSC has no knowledge of mobile station mobility behavior.

Figures 7, 9:
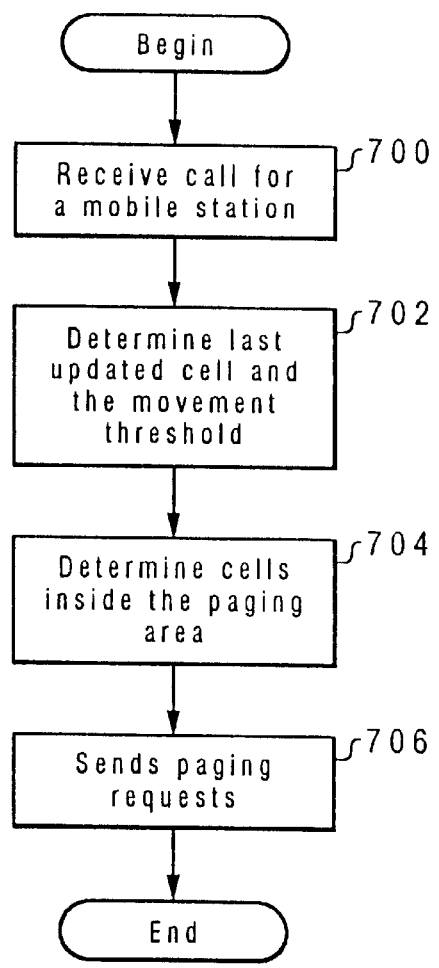
FIG. 7 is a flowchart of a paging process performed by a mobile switching center in accordance with a preferred embodiment of the present invention.
FIG. 9 is an illustration of a matrix used to determine distances between cells in accordance with the preferred embodiment of the present invention.

In FIG. 7, a flowchart of an efficient paging process followed by a mobile switching center is depicted in accordance with a preferred embodiment of the present invention. The process begins by the MSC receiving a call for mobile station 300 in its service area (step 700). Next, the MSC queries the VLR to determine both the cell in which the last location update was performed (also called the "last updated cell") and the movement threshold Th of the called mobile station (step 702). A table lookup procedure is then used to determine which cells are inside the paging area of a mobile station (step 704). The MSC keeps a matrix for determining the distance between any two cells in the MSC area. For example, in FIG. 9, matrix 900 is employed to determine distances between cells. If the last update cell location for mobile station 300 is D and the movement threshold, Th, for that mobile station is 3, the cells B, C, and D will be paged since these are the only cells that the mobile station can reside because their distance from cell D is smaller than a distance of Th (equal to 3) with respect to the last updated cell, D. As a result, the paging area consists of cells B, C, and D. The MSC sends the paging requests to the BSCs which control the cells inside the paging area of a mobile station (step 706) with the process then terminating. This example is a simplified example for purposes of illustrating one process that may be employed to determine distances between cells in a cellular system containing only four cells. Of course, those of ordinary skill in the art will realize that other processes may be employed to determine distances between cells.

Figure 8:
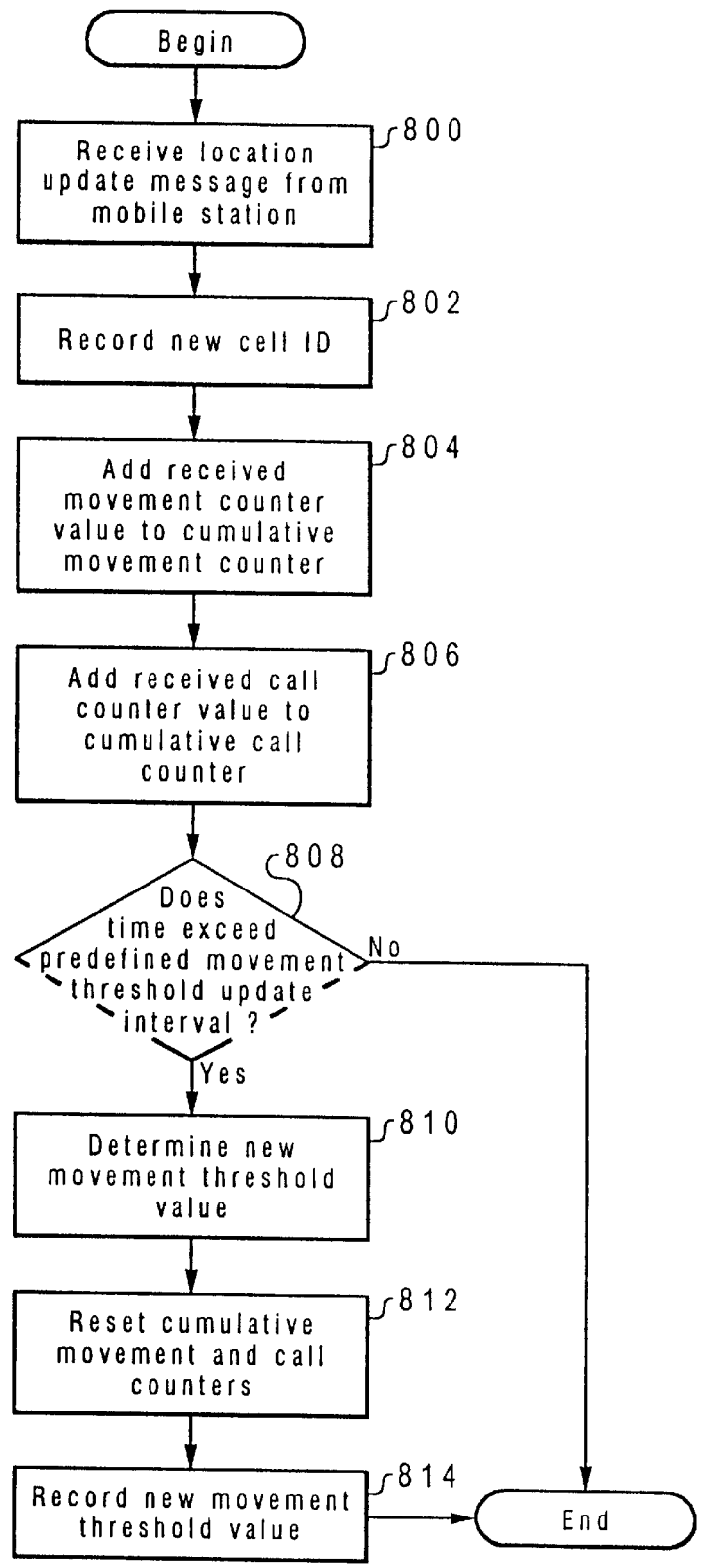
FIG. 8 is a flowchart of a movement threshold update process performed by a mobile switching center in accordance with a preferred embodiment of the present invention.

With respect to FIG. 8, a flowchart of a movement threshold update process is depicted in accordance with a preferred embodiment of the present invention. This process is performed by the MSC in the depicted example. In FIG. 8, the movement threshold update process begins when a location update message is received from a mobile station 300 which includes the movement counter 502, the call counter 504, and the new cell ID (step 800). The last updated cell is the cell in which the mobile station performs its most recent location update. The MSC then records the cell ID of the last updated cell in the VLR (step 802). The received movement counter value MC is added to the value of the cumulative movement counter MC'at the VLR (step 804). The received call counter value is then added to the value of the cumulative call counter CC'at the VLR (step 806). A determination is made as to whether the period of time since the last movement threshold was updated exceeds a predefined movement threshold update interval (step 808). If the period of time exceeds the predefined movement threshold update interval, then a new movement threshold value Th is determined by a table lookup procedure based on the value of the cumulative movement counter MC', the value of the cumulative call counter CC', and the period of time since the movement threshold was last updated (step 810). The process then resets the value of cumulative movement counter MC' and the cumulative call counter CC' to zero (step 812), and records the new movement threshold value Th in the VLR (step 814) and sends this new threshold value to the mobile station 300 with the process terminating thereafter. With reference again to step 808, if the period of time does not exceed the predefined movement threshold interval, the process then terminates.

Thus, the present invention provides an improved location update scheme for wireless communications systems. In particular, location updates may be optimized for each subscriber. This is accomplished by selecting the movement threshold Th on a per user basis according to the current mobility and call arrival patterns of the subscriber. This results in a scheme that can be fine-tuned to the characteristics of each individual subscriber. Also, the present invention provides a dynamic and adaptive scheme. This is accomplished by periodically updating the movement threshold Th for each subscriber (up to once every location update) in the depicted example. As a result, the proposed scheme can dynamically adapt to the changing mobility and calling patterns of the subscribers from time to time.

Additionally, the present invention has improved efficiency over known movement-based schemes. This is accomplished by the introduction of the movement history registers with loop-removal, which are used to significantly reduce unnecessary location updates due to ping-pong effect and localized movements generating loops occurring in known movement-based schemes. As mobility of cellular subscribers, especially pedestrians, are highly localized, this results in significant savings in the cost for location management. Furthermore, the present invention provides for low overhead at the mobile station because only a small number of counters are required at the mobile station. The present invention involves computation by increasing and decreasing counters, and the addition and removal of cell IDs from the movement history registers. As described above, the movement threshold value Th is determined by a table lookup procedure. This movement threshold table is predetermined based on the signaling cost for location registration and paging and the mobility and calling parameters considered. No online computation of the movement threshold value is necessary.

Overall, the present invention reduces the signaling overhead due to location management, which in turn reduces the wireless bandwidth utilization and increases the capacity of the signaling channel (e.g. the random access channel and the paging channel of GSM). Optimizing the location update and paging for each user results in a smaller number of unnecessary location updates and lower paging overhead. This optimization translates into higher capacity at the MSCs and BSCs.

It is important to note that while the present invention has been described in the context of a communications system including processors for processing instructions to provide the functions described, the processes of the present invention are capable of being distributed in the form of a computer readable medium of instructions in a variety of forms that the present invention applies equally regardless of the particular type of signal bearing media actually used to carry out the distribution. Examples of computer readable media include: recordable-type media such as floppy disks and CD ROMs and transmission-type media such as digital and analog communications links.

The description of the preferred embodiment of the present invention has been presented for purposes of illustration and description, but is not intended to be exhaustive or limit the invention in the form disclosed. Many modifications and variations will be apparent to those of ordinary skill in the art. The embodiment was chosen and described in order to best explain the principles of the invention and the practical application to enable others of ordinary skill in the art to understand the invention for various embodiments with various modifications as are suited to the particular use contemplated.

What is claimed is:

1. A method in a communications system for tracking mobile stations comprising:
    tracking a path for a mobile station, wherein the path has a length;
    monitoring the path for a presence of a loop; and
    removing the loop from the path in response to identifying the presence of a loop, wherein the length of the path changes and a loop-removed path is formed.

2. The method of claim 1 further comprising:
    comparing the length of the loop-removed path to a threshold; and
    performing a location update in response to the length of the path being greater than the threshold.

3. The method of claim 2 further comprising:
    updating the threshold in response to the location update.

4. The method of claim 3, wherein the updating step comprises:
    receiving the location update from the mobile station at a mobile switching center;
    determining whether a change in the threshold is required; and
    transmitting a new threshold to the mobile station in response to determining a change in the threshold is required.

5. The method of claim 4, wherein the updating step further comprises:
    receiving the new threshold at the mobile station; and
    performing the comparing step using the new threshold.

6. The method of claim 1, wherein the communications system is a code-division multiple access wireless communications system.

7. The method of claim 1, wherein the communications system is a time-division multiple access wireless communications system.

8. The method of claim 1, wherein said path is tracked and monitored for loop removal at said mobile station.

9. A communications system for tracking mobile stations comprising:
    tracking means for tracking a path for a mobile station, wherein the path has a length;
    monitoring means for monitoring the path for a presence of a loop; and
    removal means for removing the loop from the path in response to identifying the presence of a loop, wherein the length of the path changes to form a loop-removed path.

10. The communications system of claim 9 further comprising:
    comparing means for comparing the length of the loop-removed path to a threshold; and
    performing means for performing a location update in response to the length of the loop-removed path being greater than the threshold.

11. The communications system of claim 9 further comprising:
    update means for updating the threshold in response to the location update.

12. The communications system of claim 11, wherein the update means comprises:
    first reception means for receiving the location update from the mobile station at a mobile switching center;
    determination means for determining whether a change in the threshold is required; and
    transmitting means for transmitting a new threshold in response to determining a change in the threshold is required.

13. The communications system of claim 12, wherein the update means comprises:
    second reception means for receiving the new threshold at the mobile station; and
    means for comparing the length of the path to the new threshold.

14. The communications system of claim 9, wherein the communications system is a code-division multiple access wireless communications system.

15. The communications system of claim 9, wherein the communications system is a time-division multiple access wireless communications system.

16. The communications system of claim 9, wherein the tracking means, the monitoring means and the removal means are integral to the mobile station.

17. A mobile station comprising:
    a plurality of mobility history registers, wherein an identification of cells visited by the mobile station are stored within the plurality of mobility history registers;
    a path length register having a counter identifying a length of a path at the mobile station;
    a threshold register, wherein a threshold is stored within the threshold register;
    tracking means for tracking the path for the mobile station, wherein the path has a length;
    monitoring means for monitoring the path for a presence of a loop;
    removal means for removing the loop from the path in response to identifying the presence of a loop, wherein the length of the path changes; and transmission means for performing a location update in response to the counter equaling the threshold.

18. The mobile station of claim 17 further comprising:
reception means for receiving a new threshold for storage within the threshold register.

19. The mobile station of claim 17, wherein the counter of the path length register is increased by one after each crossing of a cell boundary.

20. The mobile station of claim 17 further comprising a call counter register, wherein the call counter register stores a call counter that is increased by one after each termination of a call involving the mobile station.

21. The mobile station of claim 20, wherein the transmission means sends data stored in the path length register and the call counter register when performing a location update.

22. The mobile station of claim 17, wherein the mobile station is configured for use in a code-division multiple access wireless communications system.

23. The mobile station of claim 17, wherein the mobile station is configured for use in a time-division multiple access wireless communications system.

24. A wireless communications system comprising:
A mobile station including:
- a plurality of mobility history registers, wherein an identification of cells visited by the mobile station are stored within the plurality of mobility history registers;
- a path length register having a counter identifying a length of a path of the mobile station;
- a threshold register, wherein a threshold is stored within the threshold register;
- tracking means for tracking the path for the mobile station, wherein the path has a length;
- monitoring means for monitoring the path for a presence of a loop; and
- removal means for removing the loop from the path in response to identifying the presence of a loop, wherein the length of the path changes; and
- transmission means for performing a location update in response to the counter equaling the threshold; and
a mobile switching center, wherein the mobile switching center tracks the mobile station in response to the location update performed by the mobile station.

25. The wireless communications system of claim 24 further comprising a movement counter and a call counter, wherein the location update includes sending the value of the movement counter and the call counter to the mobile switching center.

26. The wireless communications system of claim 24, wherein the mobile switching center includes:
determination means for determining whether a new threshold should be assigned to the mobile station, wherein the transmission means is responsive to a determination that a new threshold should be assigned to the mobile station for transmitting the new threshold to the mobile station.

27. The wireless communications system of claim 26, wherein the determination means includes a table used to determine whether a new threshold should be assigned to the mobile station.

28. The wireless communications system of 25, wherein the table is based on the topology of the network.

29. The wireless communications system of claim 24, wherein the wireless communications system is a code-division multiple access wireless communications system.

30. The wireless communications system of claim 24, wherein the wireless communications system is a time-division multiple access wireless communications system.

31. A mobile station comprising:
- a plurality of registers, the plurality of registers storing cell identifiers for cells entered by the mobile station, the cell identifiers being arranged in an order in which corresponds to the order the mobile station entered the cells, wherein a first cell identifier in the registers is associated with a first cell entered by the mobile station and a last cell identifier within the registers is a last cell entered by the mobile station;
- a path length register, wherein a path length traveled by the mobile station after a location update is stored within the path length register;
- a threshold value register, wherein a threshold value is stored within the threshold value register;
- a first mode of operation in which the mobile station identifies entry of the mobile station into a cell, the cell having a cell identification;
- a second mode of operation, responsive to the first mode of operation identifying entry of the mobile station into a cell, in which the mobile station determines whether the cell identifier for the present cell is present within the plurality of registers;
- a third mode of operation, responsive the second mode of operation determining that the cell identifier for the present cell is present within the registers, wherein the mobile station deletes a first cell identifier within the registers, wherein the mobile station deletes successive cell identifiers within the registers until the cell identifier of the top register is equal to the first cell identifier of the present cell;
- a fourth mode of operation, responsive to the second mode of operation determining that the cell identifier for the present cell is absent from the registers in which the mobile station adds the cell identifier for the present cell as the first cell identifier within the registers;
- a fifth mode of operation, responsive to the fourth mode of operation according the cell identifier, in which the mobile station determines whether the path length is equal to the threshold; and
- a sixth mode of operation, responsive to the fifth mode of operation determining that the path length is equal to the threshold, in which the mobile station performs a location update.

32. The mobile station of claim 31, wherein the sixth mode of operation further comprises:
removing all cell identifiers from the registers; and
resetting the path length register to zero.

33. The mobile station of claim 32, wherein the mobile station determines whether a new threshold is received and updates the threshold register.

* * * * *